US012455466B2

(12) United States Patent
Bian

(10) Patent No.: US 12,455,466 B2
(45) Date of Patent: Oct. 28, 2025

(54) PHOTONICS CHIP STRUCTURES INCLUDING AN EDGE COUPLER AND A LAYER EXHIBITING AN ELECTRIC-FIELD-INDUCED POCKELS EFFECT

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 275 days.

(21) Appl. No.: 18/209,680

(22) Filed: Jun. 14, 2023

(65) Prior Publication Data

US 2024/0419023 A1   Dec. 19, 2024

(51) Int. Cl.
 *G02F 1/035*   (2006.01)
(52) U.S. Cl.
 CPC .......... *G02F 1/035* (2013.01); *G02F 2202/20* (2013.01)
(58) Field of Classification Search
 CPC ............................ G02F 1/035; G02F 2202/20
 See application file for complete search history.

(56) References Cited

U.S. PATENT DOCUMENTS

| 10,788,689 | B1 * | 9/2020 | Lentine | ................. | G02F 1/0356 |
| 11,215,756 | B2 | 1/2022 | Bian et al. | | |
| 2022/0317483 | A1 * | 10/2022 | Chakravarty | ........... | G02F 1/035 |

OTHER PUBLICATIONS

M. He et al., "High-Performance Hybrid Silicon and Lithium Niobate Mach-Zehnder Modulators," in Asia Communications and Photonics Conference (ACPC) 2019, OSA Technical Digest (Optica Publishing Group, 2019), paper T4H.3.
Valdez, F., Mere, V., Wang, X. et al. 1"10 GHZ, 110 mW hybrid silicon-lithium niobate Mach-Zehnder modulator." Scientific Reports 12, 18611 (2022). https://doi.org/10.1038/s41598-022-23403-6.
Nicholas Boynton et al., "A heterogeneously integrated silicon photonic/lithium niobate travelling wave electro-optic modulator," Optics Express 28, 1868-1884 (2020).
Changran Hu et al., "High-efficient coupler for thin-film lithium niobate waveguide devices," Optics Express 29, 6397-5406 (2021).
Pan Ying et al., "Low-loss edge-coupling thin-film lithium niobate modulator with an efficient phase shifter," Optics Letter 46, 1478-1481 (2021).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

(Continued)

*Primary Examiner* — Ryan A Lepisto
(74) *Attorney, Agent, or Firm* — Thompson Hine LLP; Anthony Canale

(57) ABSTRACT

Photonics chip structures including an edge coupler and a layer that exhibits an electric-field-induced Pockels effect and methods of forming such structures. The structure comprises a substrate, an edge coupler on the substrate, and a layer including a portion that has an overlapping relationship with the edge coupler. The layer comprises a material that exhibits an electric-field-induced Pockels effect.

20 Claims, 7 Drawing Sheets

(56) References Cited

OTHER PUBLICATIONS

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th31.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

Y. Bian et al., "Integrated Laser Attach Technology on a Monolithic Silicon Photonics Platform," 2021 IEEE 71st Electronic Components and Technology Conference (ECTC), San Diego, CA, USA, 2021, pp. 237-244, doi: 10.1109/ECTC32696.2021.00048.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Bian, Yusheng, "Structures for an Optical Coupler and Related Methods" filed on Aug. 22, 2022 as a U.S. Appl. No. 17/892,584.

* cited by examiner

PHOTONICS CHIP STRUCTURES INCLUDING AN EDGE COUPLER AND A LAYER EXHIBITING AN ELECTRIC-FIELD-INDUCED POCKELS EFFECT

BACKGROUND

The disclosure relates to photonics chips and, more specifically, to photonics chip structures including an edge coupler and a layer that exhibits an electric-field-induced Pockels effect and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as an optical fiber or a laser.

Thin film lithium niobate (TFLN) may be integrated into a photonic component. Lithium niobate is an electro-optical material characterized by optical properties, such as large second-order nonlinearity, a wide transparency window, and low nonlinear absorption, that are favorable for certain types of photonic components. Photonic components including a TFLN layer may suffer from several disadvantages, such as a large footprint and a limited power handling capability.

Improved photonics chip structures including an edge coupler and a layer that exhibits an electric-field-induced Pockels effect and methods of forming such structures are needed.

SUMMARY

In an embodiment of the invention, a structure for a photonics chip is provided. The structure comprises a substrate, an edge coupler on the substrate, and a layer including a portion that has an overlapping relationship with the edge coupler. The layer comprises a material that exhibits an electric-field-induced Pockels effect.

In an embodiment of the invention, a method of forming a photonics chip is provided. The method comprises forming an edge coupler on a substrate, and forming a layer that includes a portion that has an overlapping relationship with the edge coupler. The layer comprises a material that exhibits an electric-field-induced Pockels effect.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
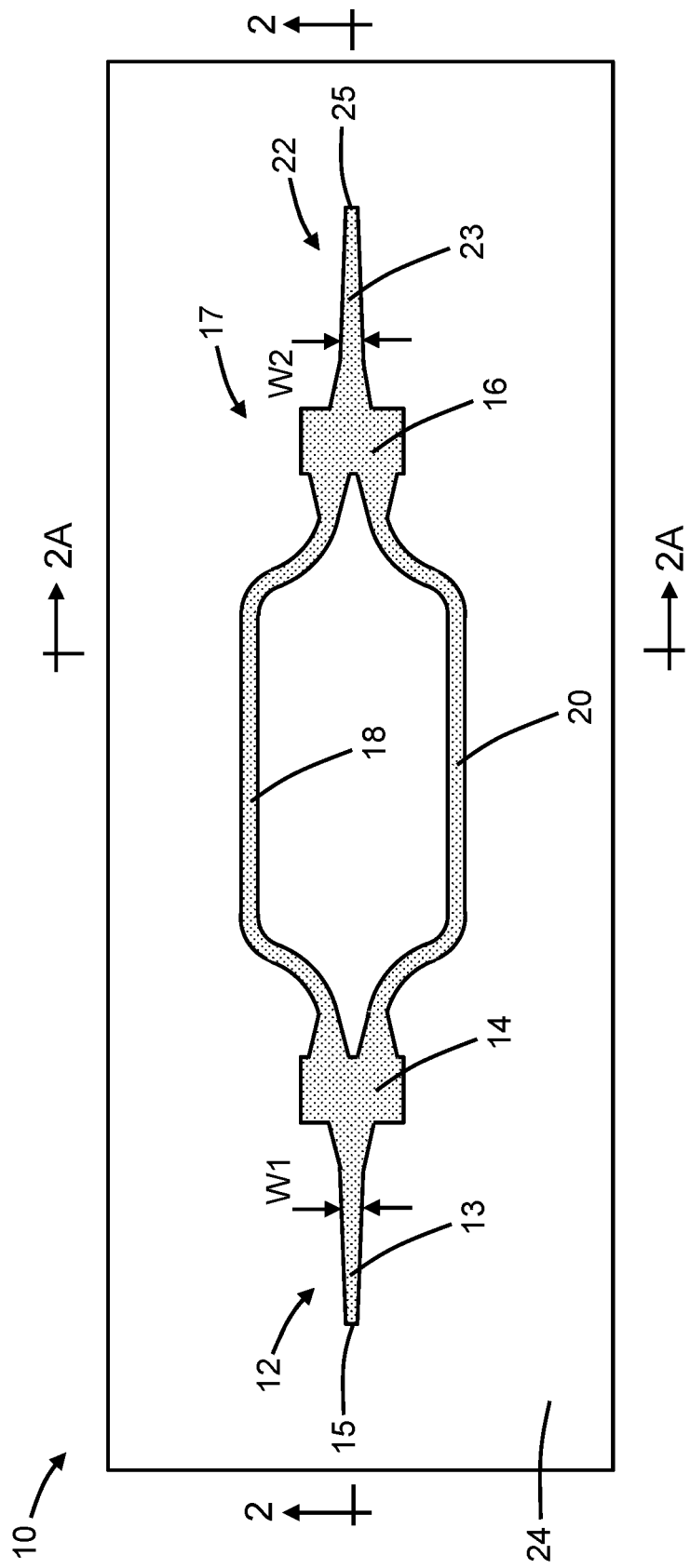
FIG. 1 is a top view of a structure at an initial fabrication stage of a processing method in accordance with embodiments of the invention.
Figure 2:
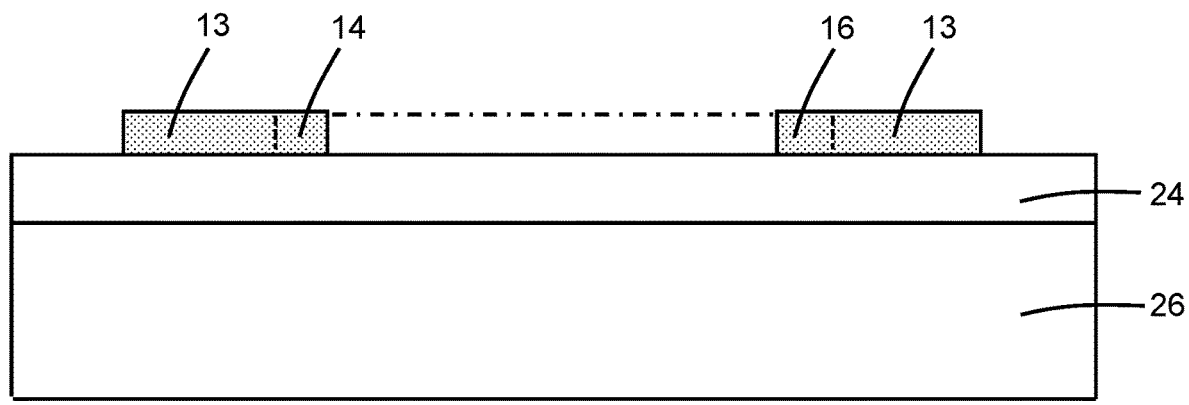
FIG. 2 is a cross-sectional view taken generally along line 2-2 in FIG. 1.
Figure 2A:
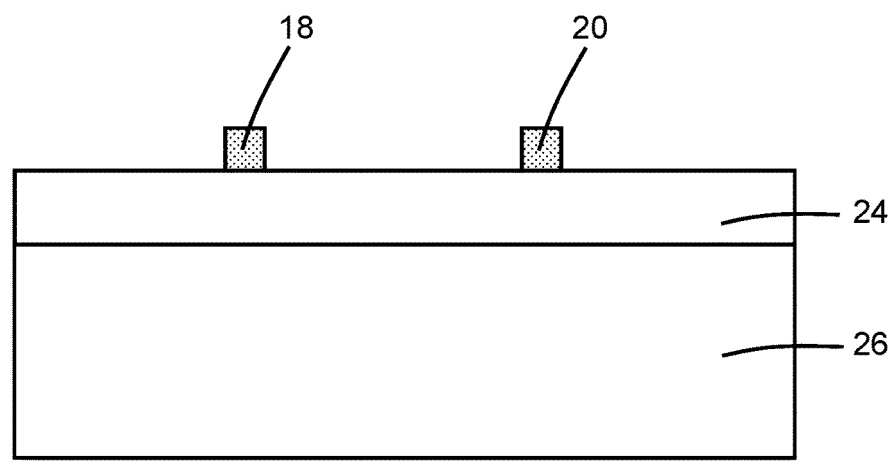
FIG. 2A is a cross-sectional view taken generally along line 2A-2A in FIG. 1.

With reference to FIGS. 1, 2, 2A and in accordance with embodiments of the invention, a structure 10 for a photonics chip includes an edge coupler 12, an input optical coupler 14 connected to the edge coupler 12, an output optical coupler 16, and waveguide cores 18, 20 defining arms that are separately routed from the input optical coupler 14 to the output optical coupler 16, and an edge coupler 22 connected to the output optical coupler 16. The input optical coupler 14, output optical coupler 16, and waveguide cores 18, 20 define portions of a modulator 17.

The edge coupler 12, input optical coupler 14, output optical coupler 16, waveguide cores 18, 20, and edge coupler 22 are disposed on, and over, a dielectric layer 24 and a substrate 26. In an embodiment, the dielectric layer 24 may be comprised of a dielectric material, such as silicon dioxide, and the substrate 26 may be comprised of a semiconductor material, such as single-crystal silicon. In an embodiment, the dielectric layer 24 may be a buried oxide layer of a silicon-on-insulator substrate. The edge coupler 12, input optical coupler 14, output optical coupler 16, waveguide cores 18, 20, and edge coupler 22 are separated from the substrate 26 by the dielectric material of the intervening dielectric layer 24. In an alternative embodiment, may one or more additional dielectric layers comprised of, for example, silicon dioxide may be positioned between the edge coupler 12, input optical coupler 14, output optical coupler 16, waveguide cores 18, 20, and edge coupler 22 and the upper surface of the dielectric layer 24.

In an embodiment, the edge coupler 12, input optical coupler 14, output optical coupler 16, waveguide cores 18, 20, and edge coupler 22 may be comprised of a material having a refractive index that is greater than the refractive index of silicon dioxide. In an embodiment, the edge coupler 12, input optical coupler 14, output optical coupler 16, waveguide cores 18, 20, and edge coupler 22 may be comprised of a semiconductor material, such as single-crystal silicon, amorphous silicon, or polysilicon. In an alternative embodiment, the edge coupler 12, input optical coupler 14, output optical coupler 16, waveguide cores 18, 20, and edge coupler 22 may be comprised of a dielectric material, such as silicon nitride, silicon oxynitride, or aluminum nitride. In alternative embodiments, other materials, such as a III-V compound semiconductor, may be used to form the edge coupler 12, input optical coupler 14, output optical coupler 16, waveguide cores 18, 20, and edge coupler 22. In an alternative embodiment, the edge coupler 12, input optical coupler 14, output optical coupler 16, waveguide cores 18, 20, and edge coupler 22 may include a stack of layers, such as a lower layer of silicon and an upper layer of silicon nitride stacked to overlap with the layer of silicon.

In an embodiment, the edge coupler 12, input optical coupler 14, output optical coupler 16, waveguide cores 18, 20, and edge coupler 22 may be formed by patterning a layer with lithography and etching processes. In an embodiment, an etch mask may be formed by a lithography process over the layer, and unmasked sections of the layer may be etched and removed with an etching process. The masked sections of the layer may determine the patterned shapes of the edge coupler 12, input optical coupler 14, output optical coupler 16, waveguide cores 18, 20, and edge coupler 22. In an embodiment, the edge coupler 12, input optical coupler 14, output optical coupler 16, waveguide cores 18, 20, and edge coupler 22 may be formed by patterning the semiconductor material (e.g., single-crystal silicon) of the device layer of a silicon-on-insulator substrate. In an embodiment, the edge coupler 12, input optical coupler 14, output optical coupler 16, waveguide cores 18, 20, and edge coupler 22 may be formed by patterning a deposited layer comprised of their constituent material (e.g., silicon nitride).

In an embodiment, the input optical coupler 14 and output optical coupler 16 may be configured as multi-mode interference couplers each having a multi-mode interference region. The input optical coupler 14 has an input port coupled to the edge coupler 12 and output ports respectively coupled to the waveguide cores 18, 20. The input optical coupler 14 splits the input light supplied from the edge coupler 12 to the waveguide cores 18, 20. In an embodiment, the input optical coupler 14 may be a 50-50 directional coupler that splits the input light evenly between the waveguide cores 18, 20. The output optical coupler 16 has an output port coupled to the edge coupler 22 and input ports coupled to the waveguide cores 18, 20. The output optical coupler 16 combines the light received from the waveguide cores 18, 20 and may also be a 50-50 directional coupler to match the input optical coupler 14.

The edge coupler 12 may include a tapered section 13 of a waveguide core that is connected to the input optical coupler 14. The tapered section 13 of the edge coupler 12 terminates at a facet 15. The tapered section 13 may have a width dimension W1 that increases with increasing distance from the facet 15. In an embodiment, the width dimension W1 of the tapered section 13 may increase linearly with increasing distance from the facet 15. In an alternative embodiment, the width dimension W1 of the tapered section 13 may vary based on a non-linear function, such as a quadratic function, a cubic function, a parabolic function, a sine function, a cosine function, a Bezier function, or an exponential function. In an embodiment, the tapered section 13 may include a single stage of tapering characterized by a taper angle. In an alternative embodiment, the tapered section 13 may taper in multiple stages each characterized by a different taper angle.

The edge coupler 22 may include a tapered section 23 of a waveguide core that is connected to the input optical coupler 14. The tapered section 23 of the edge coupler 22 terminates at a facet 25. The tapered section 23 may have a width dimension W2 that increases with increasing distance from the facet 25. In an embodiment, the width dimension W2 of the tapered section 23 may increase linearly with increasing distance from the facet 25. In an alternative embodiment, the width dimension W2 of the tapered section 23 may vary based on a non-linear function, such as a quadratic function, a cubic function, a parabolic function, a sine function, a cosine function, a Bezier function, or an exponential function. In an embodiment, the tapered section 23 may include a single stage of tapering characterized by a taper angle. In an alternative embodiment, the tapered section 23 may taper in multiple stages each characterized by a different taper angle.

In alternative embodiments, the edge couplers 12, 22 may have a different configuration. For example, the edge couplers 12, 22 may be divided into segments. As another example, the edge couplers 12, 22 may include sections that are arranged to provide multiple tips. As another example, the edge couplers 12, 22 may include sections that are arranged in different levels.

The waveguide cores 18, 20 include bends adjacent to the input optical coupler 14 that increase the separation between the waveguide cores 18, 20 and decrease crosstalk between the arms of the modulator 17. The waveguide cores 18, 20 include bends adjacent to the output optical coupler 16 that decrease the separation between the waveguide cores 18, 20 to converge at the output optical coupler 16.

Figure 3:
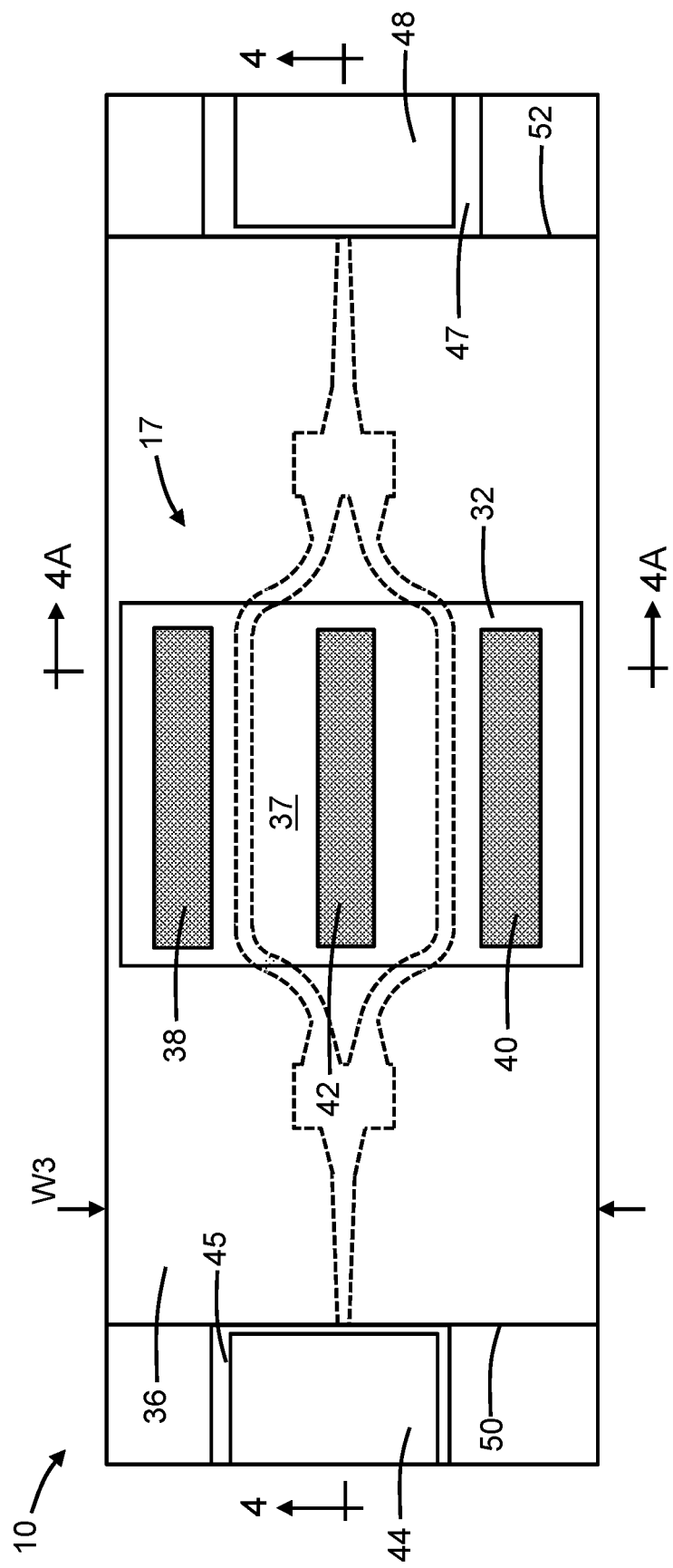
FIG. 3 is a top view of the structure at a fabrication stage of the processing method subsequent to FIGS. 1, 2, 2A.
Figure 4:
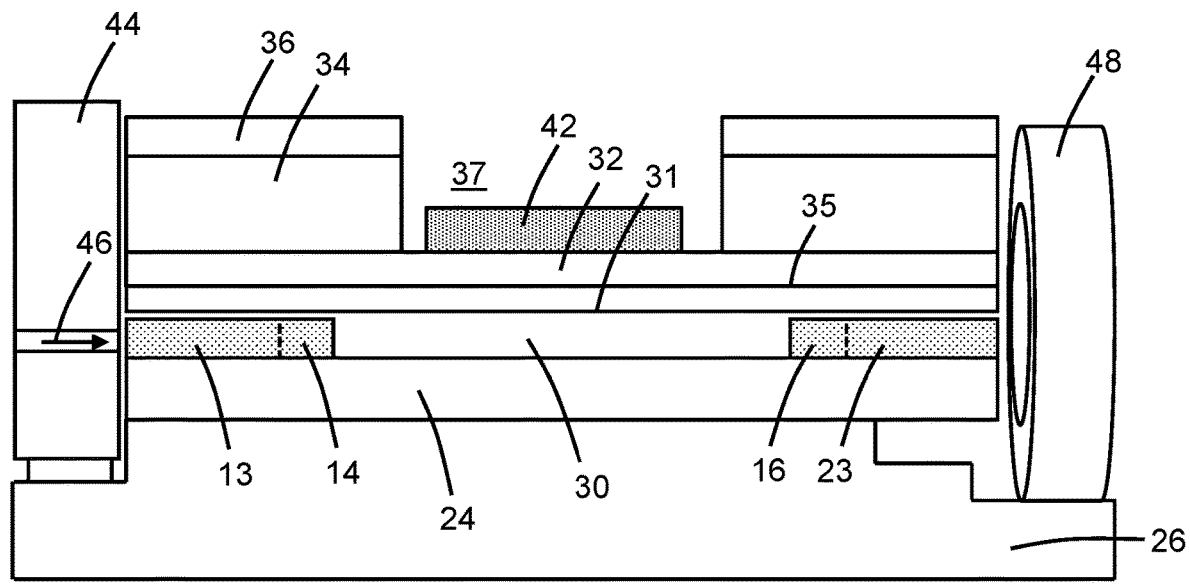
FIG. 4 is a cross-sectional view taken generally along line 4-4 in FIG. 3.
Figure 4A:
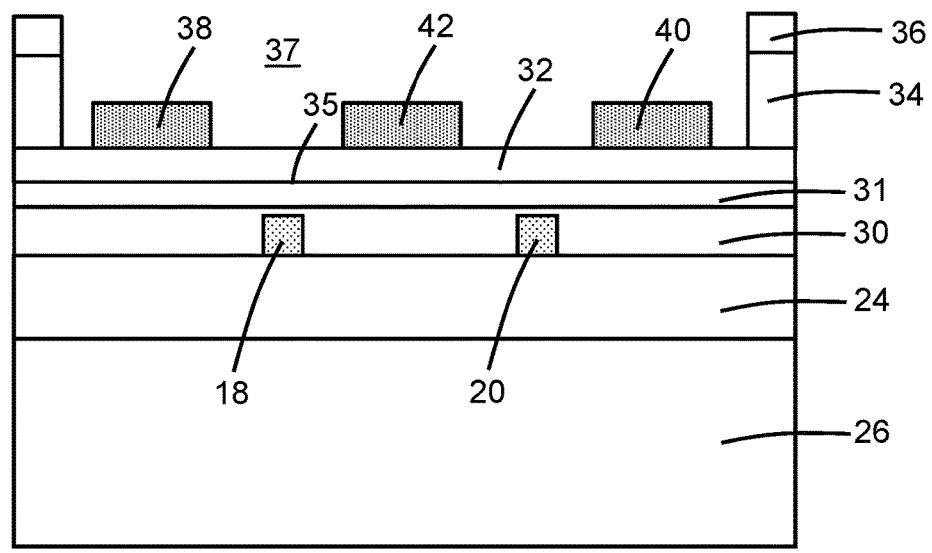
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, dielectric layers 30, 31 may be formed over the edge coupler 12, input optical coupler 14, output optical coupler 16, waveguide cores 18, 20, and edge coupler 22. The dielectric layers 30, 31 may be comprised of a dielectric material, such as silicon dioxide. The edge coupler 12, input optical coupler 14, output optical coupler 16, waveguide cores 18, 20, and edge coupler 22 may be embedded in the dielectric material of the dielectric layer 30.

A layer 32 may be disposed on the dielectric layer 31. The layer 32 may be carried on a dielectric layer 34 and a substrate 36. In an embodiment, the dielectric layer 34 may be comprised of a dielectric material, such as silicon dioxide, having a refractive index that is less than the refractive index of the layer 32, and the substrate 36 may be comprised of silicon, lithium niobate, quartz, or fused silica. The layer 32 may be bonded to the dielectric layer 31 by a bonding process, such as dielectric bonding or hybrid bonding. The layer 32 may adjoin the dielectric layer 31 along a bonding interface 35, which is disposed between the layer 32 and the dielectric layer 31. The layer 32 may be formed on the dielectric layer 34, and the substrate 36 may be manipulated to place the layer 32 in a contacting relationship with the dielectric layer 30 in advance of the bonding process. In an embodiment, after the contacting relationship is established, a low-temperature thermal anneal may be performed at a sufficient temperature and for a sufficient duration to create a face-to-face bond along the bonding interface 35 between the contacting surfaces of the dielectric layer 31 and the layer 32. In an embodiment, the bonding interface 35 may lack any additional material, such as an adhesive, to promote the bonding between the surface of the dielectric layer 31 and the surface of the layer 32. In an alternative embodiment, a dielectric layer may be formed on the layer 32 and bonded to the dielectric layer 31 along the bonding interface 35.

In an embodiment, the layer 32 may be comprised of a material that exhibits an electric-field-induced Pockels effect in which the refractive index varies in proportional to the strength of an applied electric field according to an electro-optic coefficient. In an embodiment, the layer 32 may be comprised of a crystalline material that lacks inversion symmetry and that is characterized by an optic axis whose refractive index is controllable by an applied electric field. In an embodiment, the layer 32 may be comprised of lithium niobate. In an embodiment, the layer 32 may be comprised of thin film lithium niobate having a thickness in a range of 300 nanometers to 900 nanometers. In alternative embodiments, the layer 32 may be comprised of lithium tantalate, lithium niobate doped with magnesium oxide, or barium titanate. In alternative embodiments, the layer 32 may be comprised of a binary or ternary III-V compound semiconductor material, such as gallium nitride, indium gallium nitride, indium phosphide, indium gallium arsenide, gallium arsenide, indium arsenide, or indium gallium phosphide. The layer 32 may have a width dimension W3 that is greater than the width dimension W1 of the edge coupler 12 and that is greater than the width dimension W2 of the edge coupler 22.

The structure 10 may include an electrode 38, an electrode 40, and an electrode 42 that is disposed with a juxtaposed relationship between the electrode 38 and the electrode 40. The electrodes 38, 40, 42 may be positioned on a portion of the layer 32 inside a cavity 37 that is patterned by lithography and etching processes in the dielectric layer 34 and substrate 36. The electrodes 38, 40, 42 may be comprised of a metal, such as gold, that is deposited and patterned by lithography and etching processes.

The modulator 17 further includes the electrodes 38, 40, 42, and the portion of the layer 32 on which the electrodes 38, 40, 42 are located, in addition to the input optical coupler 14, the output optical coupler 16, and waveguide cores 18, 20. In an embodiment, the cavity 37 may extend to the layer 32 and the electrodes 38, 40, 42 may directly contact the portion of the layer 32. In an embodiment, the cavity 37 may extend partially through the dielectric layer 34 and the electrodes 38, 40, 42 may contact the residual thickness of the dielectric layer 34. An underlying portion of the waveguide core 18 is disposed between the electrode 38 and the electrode 42. An underlying portion of the waveguide core 20 is disposed between the electrode 40 and the electrode 42. The electrode 42 may be coupled to a signal source, such as a driver that is configured to supply radiofrequency signals to the electrode 42 in order to modulate the light propagating in the waveguide cores 18, 20 of the modulator 17. The electrode 38 and the electrode 40 may be coupled to electrical ground.

A light source 44 may be placed adjacent to the edge coupler 12. In an embodiment, the light source 44 includes a light output 46 that is aimed toward with the facet 15 of the tapered section 13 of the edge coupler 12 and that is configured to provide light in a mode propagation direction toward the edge coupler 12. In an embodiment, the light source 44 may be a laser chip that includes a semiconductor laser configured to emit light (e.g., laser light) of a given wavelength, intensity, mode shape, and mode size from the light output 46 that is coupled to the edge coupler 12. In an embodiment, the light source 44 may output coherent light in an infrared wavelength range. In an alternative embodiment, the light source 44 may be a single-mode optical fiber. In an alternative embodiment, the light source 44 may be a multi-mode optical fiber.

The light source 44 may be disposed inside a cavity 45 in the substrate 26 that is formed adjacent to the facet 15 of the edge coupler 12. In an alternative embodiment, an undercut may extend in the substrate 26 from the cavity 45 beneath the edge coupler 12 such that a portion of the dielectric layer 24 defines a membrane that supports the edge coupler 12 over the undercut. In an alternative embodiment, a sealed undercut may be provided in the substrate 26 beneath the waveguide cores 18, 20 of the modulator 17.

An optical fiber 48 may be placed adjacent to the edge coupler 22. The optical fiber 48 is configured to receive modulated light output from the facet 25 of the tapered section 23 of the edge coupler 22 and to route the modulated light away from the edge coupler 22. For example, the optical fiber 48 may route the modulated light output from the edge coupler 22 over a long distance to a remote receiver. The optical fiber 48 may be disposed inside a groove 47 in the substrate 26 that is formed adjacent to the facet 25 of the edge coupler 22. In an alternative embodiment, an undercut may extend in the substrate 26 from the groove 47 beneath the edge coupler 22 such that a portion of the dielectric layer 24 defines a membrane that supports the edge coupler 22 over the undercut.

A portion of the layer 32 overlaps with the edge coupler 12. In that regard, the layer 32 has a side edge 50 that is disposed adjacent to the facet 15 at the end of the tapered section 13 of the edge coupler 12. In an embodiment, the side edge 50 of the layer 32 and the facet 15 of the tapered section 13 of the edge coupler 12 may be coterminous. In an embodiment, the side edge 50 of the layer 32 and the facet 15 of the tapered section 13 of the edge coupler 12 may be substantially coterminous.

A portion of the layer 32 also overlaps with the edge coupler 22. In that regard, the layer 32 has a side edge 52, which is opposite from the side edge 50, that is disposed adjacent to the facet 25 at the end of the tapered section 23 of the edge coupler 22. In an embodiment, the side edge 52 of the layer 32 and the facet 25 of the tapered section 23 of the edge coupler 22 may be coterminous. In an embodiment, the side edge 52 of the layer 32 and the facet 25 of the tapered section 23 of the edge coupler 22 may be substantially coterminous.

The structure 10 may define a transmitter in which the modulator 17 is configured to modulate light, such as continuous infrared light, received from the light source 44 via the edge coupler 12 and to output the modulated light via the edge coupler 22 to the optical fiber 48 for transmission to a remote location. In use, the edge coupler 12 may receive light from the light source 44 as input to the structure 10. The input optical coupler 14 splits the input light between the waveguide cores 18, 20. A radiofrequency signal may be applied as a highspeed data signal to the electrode 42. The output optical coupler 16 combines the light exiting the waveguide cores 18, 20 to provide either constructive or destructive interference according to the value of the phase difference. Light may be output from the output optical coupler 16 to the edge coupler 22 due to constructive interference if the phase delay is zero or not output due to destructive interference if the phase difference is equal to one-half wavelength.

The portion of the layer 32 overlapping with the edge coupler 12 may improve the efficiency of the light coupling between the light source 44 and the edge coupler 12 and, thereby, decrease light loss during transfer from the light source 44 to the edge coupler 12. The portion of the layer 32 overlapping with the edge coupler 22 may improve the efficiency of the light coupling between the edge coupler 22 and the optical fiber 48 and, thereby, decrease light loss during transfer from the edge coupler 12 to the optical fiber 48.

Figure 5:
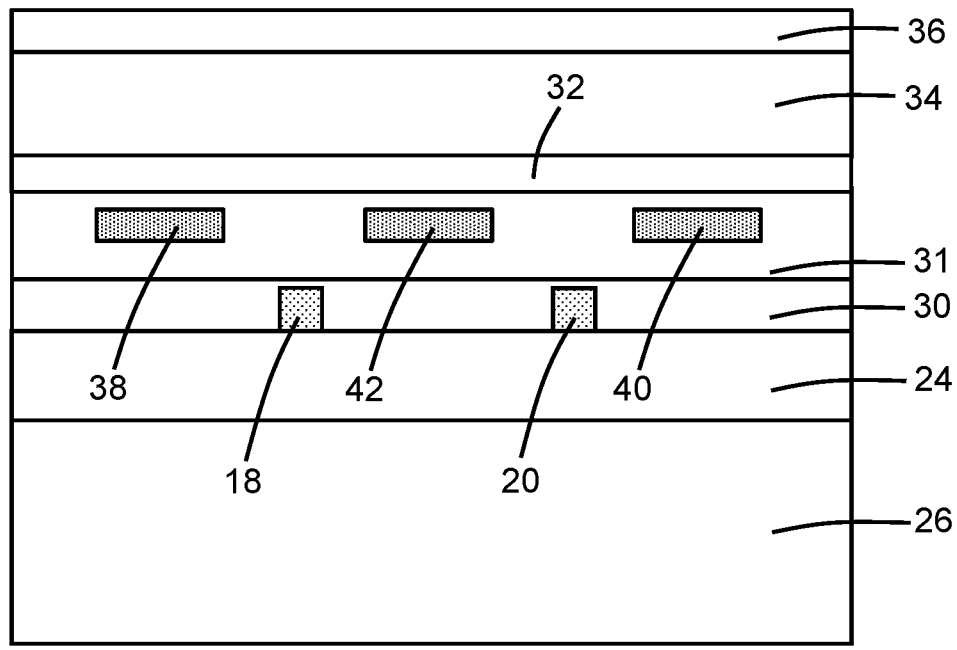
FIG. 5 is a cross-sectional view of a structure in accordance with alternative embodiments of the invention.

With reference to FIG. 5 and in accordance with alternative embodiments, the electrodes 38, 40, 42 may be formed in the dielectric layer 31 and below the layer 32 instead of being formed on and above the layer 32. The underlying waveguide core 18 may be disposed in a lateral direction between the electrode 38 and the electrode 42. The underlying waveguide core 20 may be disposed in a lateral direction between the electrode 40 and the electrode 42. A consequence of this modification is that the cavity 37 is absent such that the dielectric layer 34 and substrate 36 may be fully intact after bonding the layer 32 to the dielectric layer 31 along the bonding interface 35.

Figure 6:
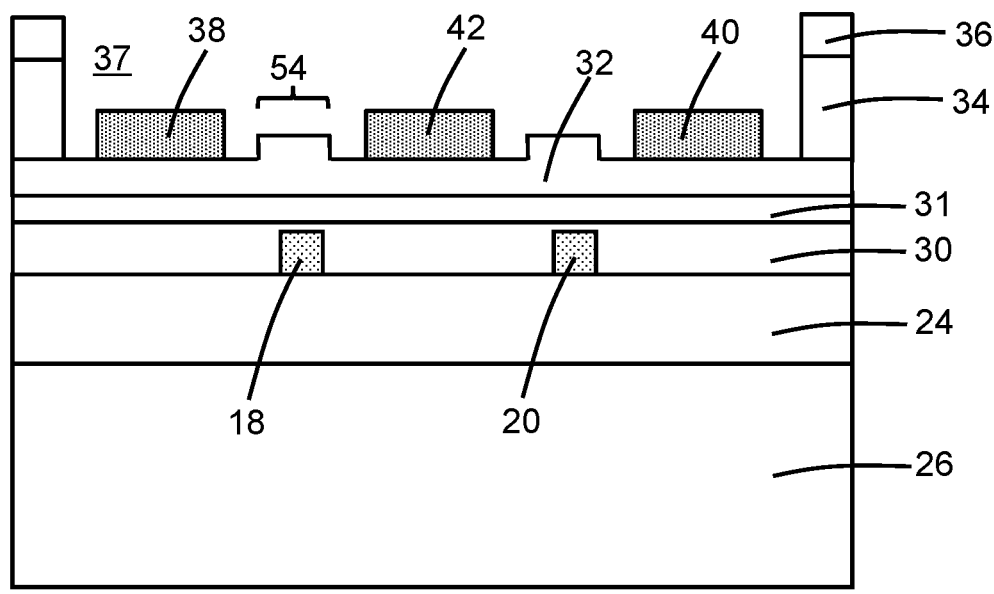
FIG. 6 is a cross-sectional view of a structure in accordance with alternative embodiments of the invention.

With reference to FIG. 6 and in accordance with alternative embodiments, the layer 32 may include ridges 54 that are disposed between the electrodes 38, 40, 42 inside the cavity 37. One of the ridges 54 may be disposed between the electrode 38 and the electrode 40, and the other of the ridges 54 may be disposed between the electrode 42 and the electrode 40. In an embodiment, the ridges 54 may extend from a side edge of the cavity 37 adjacent to the input optical coupler 14 to a side edge of the cavity 37 adjacent to the output optical coupler 16.

Figure 7:
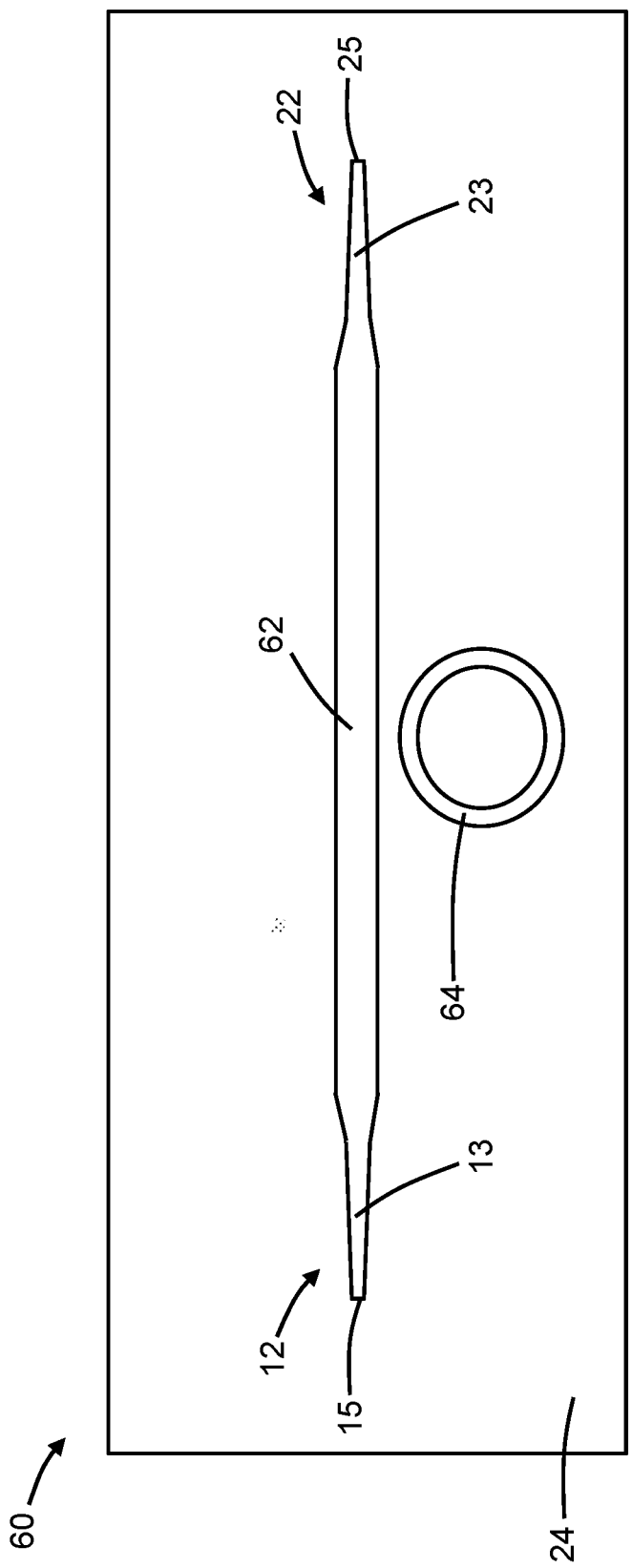
FIG. 7 is a top view of a structure in accordance with alternative embodiments of the invention.

With reference to FIG. 7 and in accordance with alternative embodiments, a structure 60 may include a waveguide core 62 disposed between the edge coupler 12 and the edge coupler 22, as well as a ring resonator 64 that is positioned adjacent to a portion of the waveguide core 62. In an embodiment, the ring resonator 64 may be separated from the adjacent portion of the waveguide core 62 by a gap. In an embodiment, the ring resonator 64 may be a waveguide core that is ring shaped or round. In an alternative embodiment, the ring resonator 64 may be a waveguide core that is racetrack shaped or oblong. In an alternative embodiment, the waveguide core 62 may include a bend at the location of the ring resonator 64 that locally decreases the width of the gap.

Figure 8:
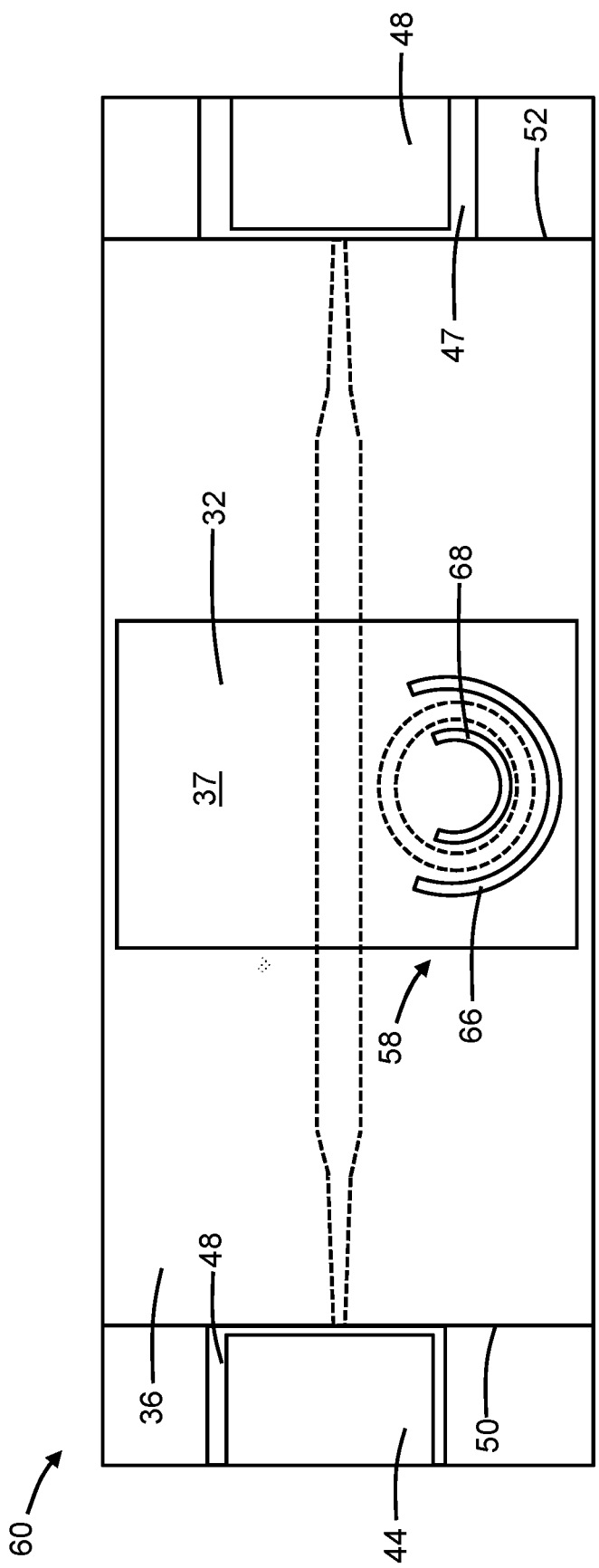
FIG. 8 is a top view of the structure at a fabrication stage of the processing method subsequent to FIG. 7.

With reference to FIG. 8 in which like reference numerals refer to like features in FIG. 7 and at a subsequent fabrication stage, electrodes 66, 68 are formed on the layer 32. The electrodes 66, 68 may have truncated ring shapes with the underlying ring resonator 64 disposed between the electrode 66 and the electrode 68. The electrodes 66, 68 are disposed in a different elevation level of the structure 60 than the ring resonator 64 with the ring resonator 64 disposed in a vertical direction between the electrodes 66, 68 and the substrate 26. In an embodiment, the electrode 66 may be disposed outside the outer perimeter of the underlying ring resonator 64, and the electrode 68 may be disposed inside the inner perimeter of the underlying ring resonator 64. In an embodiment, the electrode 66 may be disposed outside the outer circumference of the underlying ring resonator 64, and the electrode 68 may be disposed inside the inner circumference of the underlying ring resonator 64. The ring resonator 64, the electrodes 66, 68, and the portion of the layer 32 between the ring resonator 64 and electrodes 66, 68 define a modulator 58 that can be used to switch the light propagating in the waveguide core 62.

In use, light (e.g., laser light) propagating in the waveguide core 62 may be coupled and transferred in a lateral direction from the waveguide core 62 to the ring resonator 64. The electrode 66 may be coupled to a signal source, such as a driver that includes a driver amplifier that is configured to supply radiofrequency signals to the electrode 66 in order to modulate the light propagating in the waveguide core of the ring resonator 64. The electrode 68 may be coupled to electrical ground.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
   a first substrate;
   a first edge coupler on the first substrate;
   a second edge coupler on the first substrate;
   a modulator disposed between the first edge coupler and the second edge coupler, the modulator including a first electrode, a second electrode, a third electrode, a first arm including a portion laterally between the first electrode and the second electrode, and a second arm including a portion laterally between the first electrode and the third electrode;
   a layer including a first portion that has an overlapping relationship with the first edge coupler and a second portion that has an overlapping relationship with the second edge coupler, the layer comprising a material that exhibits an electric-field-induced Pockels effect; and a first dielectric layer including a portion between the modulator and the layer, the portion of the first dielectric layer adjoining the layer along a bonding interface, wherein the first electrode, the second electrode, and the third electrode are disposed between the layer and the bonding interface.

2. The structure of claim 1 wherein the first edge coupler includes a first facet, the second edge coupler includes a second facet, and the layer has a first side edge that is substantially coterminous with the first facet and a second side edge that is substantially coterminous with the second facet.

3. The structure of claim 1 wherein the first edge coupler includes a first facet, the second edge coupler includes a second facet, and the layer has a first side edge that is coterminous with the first facet and a second side edge that is coterminous with the second facet.

4. The structure of claim 1 further comprising:
a light source configured to supply light to the first edge coupler.

5. The structure of claim 4 further comprising:
an optical fiber configured to receive the light from the second edge coupler.

6. The structure of claim 1 wherein the material is lithium niobate.

7. The structure of claim 6 wherein the lithium niobate has a thickness in a range of 300 nanometers to 900 nanometers.

8. The structure of claim 1 wherein the material is a III-V compound semiconductor.

9. The structure of claim 1 wherein the material is lithium tantalate, lithium niobate doped with magnesium oxide, or barium titanate.

10. The structure of claim 1 wherein the material is crystalline and lacks inversion symmetry.

11. The structure of claim 1 wherein the first edge coupler includes a first facet, and the layer has a first side edge that is substantially coterminous with the first facet.

12. The structure of claim 11 wherein the second edge coupler includes a second facet, and the layer has a second side edge that is substantially coterminous with the second facet.

13. The structure of claim 1 wherein the first edge coupler includes a first facet, and the layer has a first side edge that is coterminous with the first facet.

14. The structure of claim 13 wherein the second edge coupler includes a second facet, and the layer has a second side edge that is coterminous with the second facet.

15. The structure of claim 1 further comprising:
a second substrate; and
a second dielectric layer on the second substrate, wherein the layer is disposed on the second dielectric layer.

16. The structure of claim 1 wherein the material has a refractive index that varies in proportional to an applied electric field strength according to an electro-optic coefficient.

17. A method of forming a structure for a photonics chip, the method comprising:
forming a first edge coupler and a second edge coupler on a first substrate;
forming a modulator disposed between the first edge coupler and the second edge coupler, wherein the modulator includes a first electrode, a second electrode, a third electrode, a first arm including a portion laterally between the first electrode and the second electrode, and a second arm including a portion laterally between the first electrode and the third electrode; and
forming a layer that includes a first portion that has an overlapping relationship with the first edge coupler and a second portion that has an overlapping relationship with the second edge coupler, wherein the layer comprises a material that exhibits an electric-field-induced Pockels effect,
wherein a dielectric layer includes a portion between the modulator and the layer, the portion of the dielectric layer adjoins the layer along a bonding interface, and the first electrode, the second electrode, and the third electrode are disposed between the layer and the bonding interface.

18. The method of claim 17 further comprising:
bonding the portion of the dielectric layer to the layer along the bonding interface by dielectric bonding or hybrid bonding.

19. The method of claim 17 further comprising:
placing the layer in a contacting relationship with the portion of the dielectric layer; and
performing a thermal anneal to create a face-to-face bond along the bonding interface.

20. The method of claim 17 wherein the material is lithium niobate, and the lithium niobate has a thickness in a range of 300 nanometers to 900 nanometers.

* * * * *